Feb. 23, 1960  F. W. MOSEY  2,925,698
MECHANISM FOR TYING PACKAGES AND THE LIKE
Filed Aug. 26, 1957  10 Sheets-Sheet 1
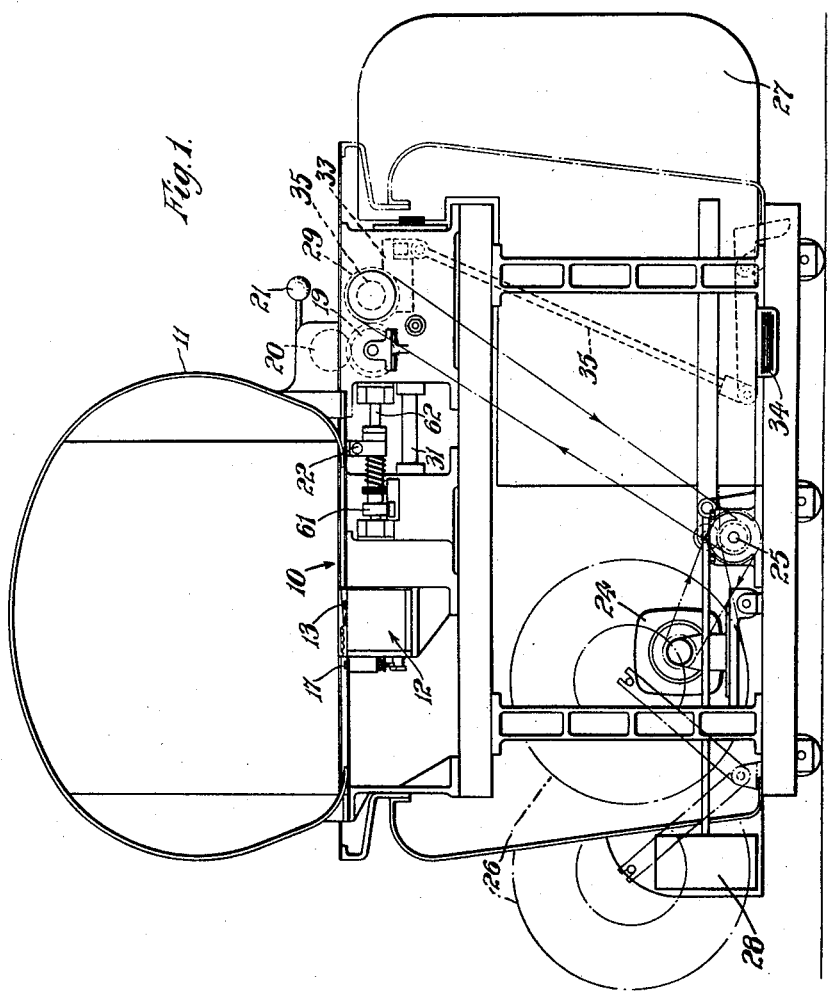
INVENTOR:
Fredrick William Mosey.
By Olson, Mecklenburger, van Holst,
Pendleton + Neuman.  Attys.

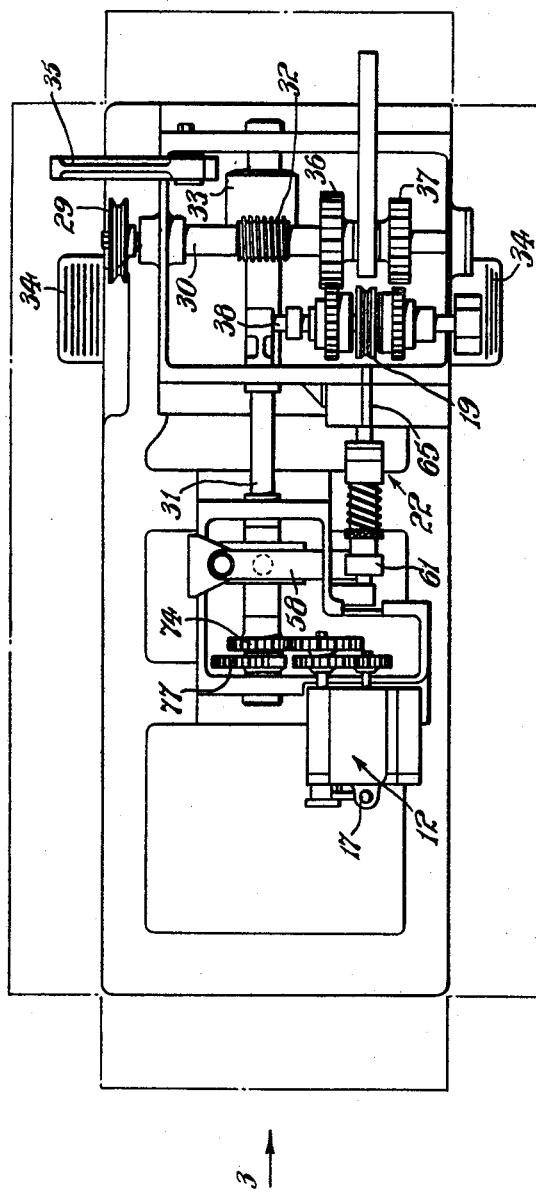

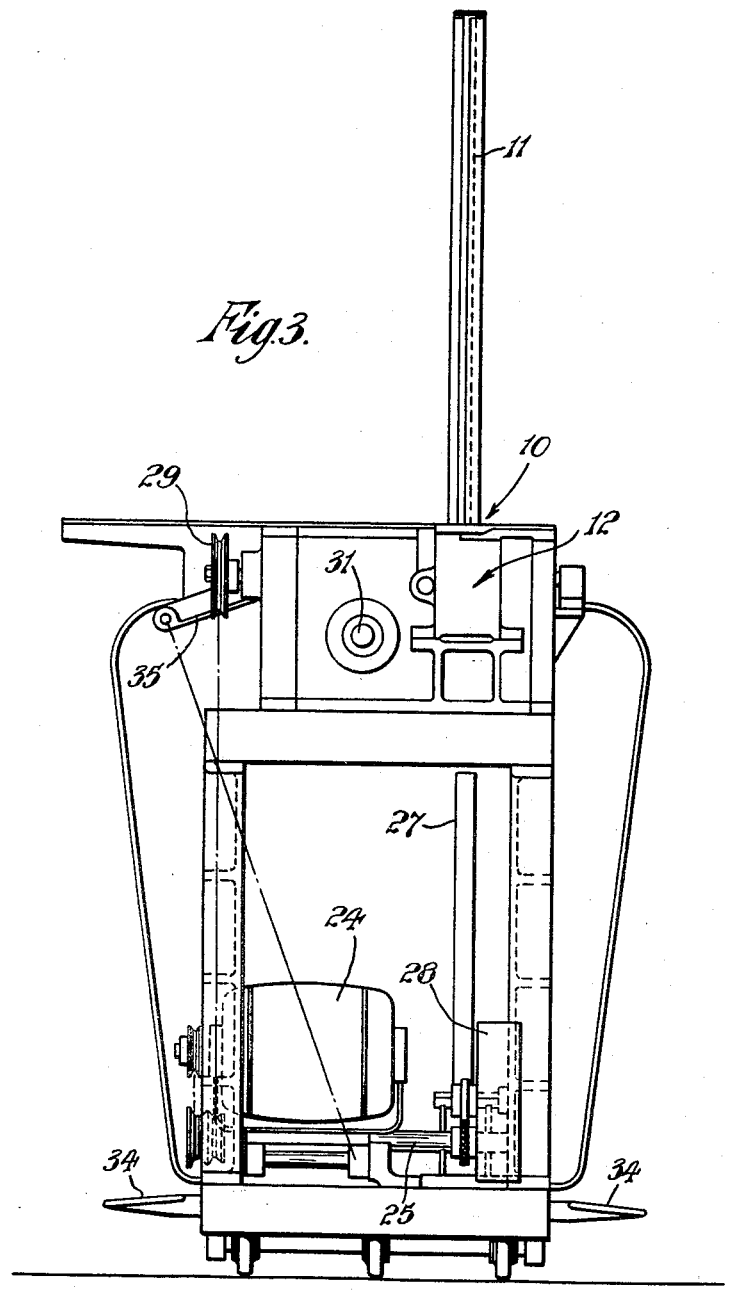

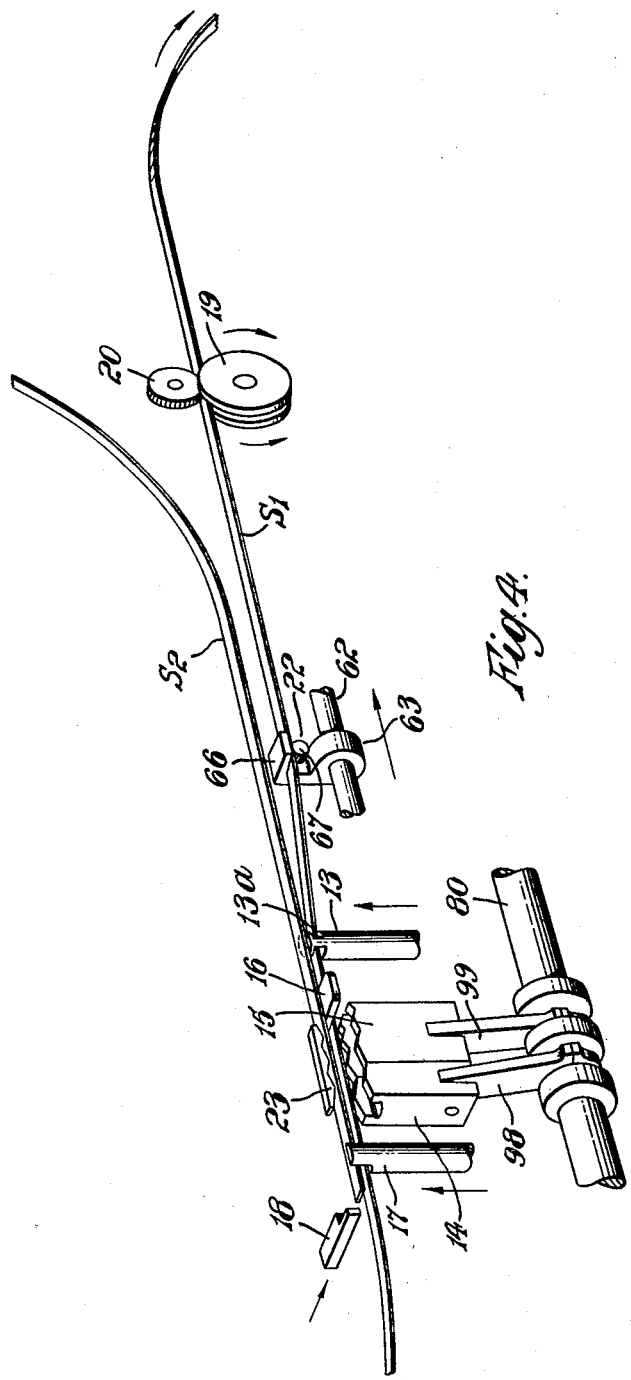

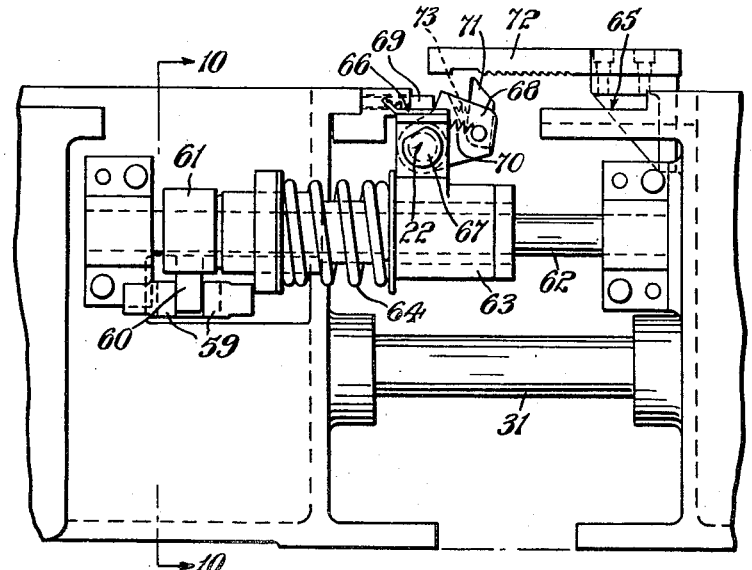
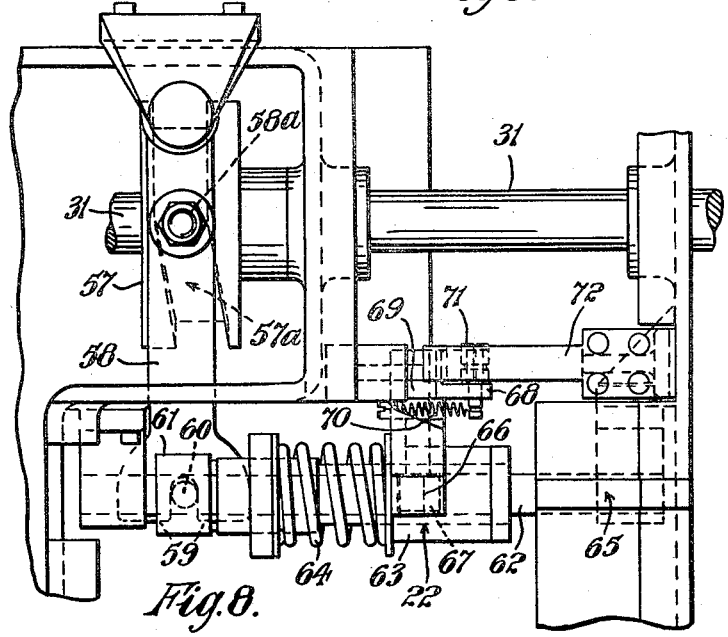

Feb. 23, 1960   F. W. MOSEY   2,925,698
MECHANISM FOR TYING PACKAGES AND THE LIKE
Filed Aug. 26, 1957   10 Sheets-Sheet 8

INVENTOR.
Fredrick William Mosey.

Feb. 23, 1960 F. W. MOSEY 2,925,698
MECHANISM FOR TYING PACKAGES AND THE LIKE
Filed Aug. 26, 1957 10 Sheets-Sheet 9

INVENTOR.
Fredrick William Mosey
By Olson, Mecklenburger, van Holst,
Pendleton & Newman. Attys.

Feb. 23, 1960 — F. W. MOSEY — 2,925,698
MECHANISM FOR TYING PACKAGES AND THE LIKE
Filed Aug. 26, 1957 — 10 Sheets-Sheet 10

INVENTOR-
Fredrick William Mosey

United States Patent Office 2,925,698
Patented Feb. 23, 1960

2,925,698

MECHANISM FOR TYING PACKAGES AND THE LIKE

Frederick William Mosey, London, England, assignor to Seal-Less Strapping Limited, London, England, a corporation of England Application August 26, 1957, Serial No. 680,164

Claims priority, application Great Britain August 31, 1956

16 Claims. (Cl. 53—198)

This invention is concerned with mechanism for tying packages or the like with flexible binding material, of the type essentially comprising a reversible feed, a holding gripper, a guide to form the material into a loop around the package or the like, a jointing device and severing means. The flexible binding material is projected by the feed from a supply past the holding gripper and the severing means, through the jointing device, around the interior of the guide, back into the gripper and again through the jointing device, and held by the closing of the gripper. The feed is then reversed to contract the looped part of the material from the guide onto the package or the like. The contracted loop is then preferably subjected to the action of means for final tensioning thereof, the coextending parts of the material are interconnected and said loop is separated from the supply by operation of the jointing device and the severing means.

In such mechanism it has heretofore been thought desirable for both the coextending parts of the binding material to be entirely free from tension during the interconnection thereof, and in order to obtain such free parts projecting oppositely into the jointing device from grippers on either side of the latter while the tension is maintained by said grippers in the intermediate looped part of the material, it has been necessary for the material to be separated from the supply before said interconnection. A supplementary gripper has accordingly been required on the far side of the jointing device from the holding gripper, severing means and feed, which supplementary gripper is adapted to be closed onto the looped part of the material where it enters the guide, following the contraction of the loop and any final tensioning thereof. I have however found it sufficient for only one of the coextending parts to be free of tension during interconnection with the other such part under the tension applied to the loop and have consequently been enabled to avoid the extra complication of such a far side supplementary gripper.

In mechanism of the aforementioned type according to the present invention, the jointing device comprises at least two dies disposed longitudinally of the coextending parts of the material, against which the parts are movable successively, one such die being thus movable sufficiently at least to hold said coextending parts before the material is severed from the supply, which severing precedes the engagement of said parts by a second such die at a point between where the parts are thus held and where the material is thus severed. Severing in this way can be most conveniently effected by a cutter on said second die adapted to coact with a fixed blade on the near or feed side of the jointing device as this die moves into engagement with the coextending parts.

The jointing operation can thus be initiated by the first die at a point between the original or first free end part of the material and the second part thereof extending to the supply, while said second part is still under tension from the reverse feed or final tensioning means. Moreover, following severing and consequent freeing of the second part, said joining operation can be continued by the second die with a portion of the first or free end part of the material now under tension, the tension preferably being that existing in the whole loop, as a result of the opening of the holding gripper and the parts having become held solely by the first die. Thus, by severing the supply prior to the second joining the parts may be engaged by each die when one of said parts is in tension. On the other hand, the holding gripper may continue to engage the free end, whereby the tension, if any, in the free end is determined by the gripper and first joining die.

The invention is more particularly suitable for use in connection with metal strip as the flexible material and in the formation of joints between overlapping parts of said strip. The dies are used to punch longitudinal shouldered incisions in these parts and to cause relative displacement of the resulting strip divisions between these incisions out of plane with divisions of either side thereof so that the shoulders become interengaged to hold said parts, by slight relative movement between the latter under the influence of the tension in the loop, when the parts are freed by the withdrawal of the dies therefrom.

In a jointing device suitable for use in accordance with the invention, dies immediately adjacent one another may conveniently be movable against and withdrawable from the coextending parts of the flexible material by cranks, eccentrics or the like, on a unidirectionally rotatable shaft adapted to make one revolution during part of an operative cycle of the mechanism as a whole, as determined by one revolution of a main cam shaft under the control of a single operation clutch. Said revolution of the first-mentioned shaft may be effected in suitably timed relation with the other operations effected by said main cam shaft, viz. forward feeding, closing of the holding gripper, reversal of the feed, with additional tensioning if required, and opening of the holding gripper.

Jointing dies which are thus operable may be associated in a unit together, with the holding gripper on the near or feed side of said dies. Such a gripper may be in the form of an upwardly movable plunger having a transverse eye through which the flexible material is first projected and then partially withdrawn by the feed, and wherein, if the severing of the material is effected as preferred between this gripper and the jointing device as by means of a cutter on the near side die of the latter in the manner already mentioned, the material will remain permanently threaded. Such a gripper plunger may be urged resiliently towards the open position and closed by a subsidiary cam shaft geared to the main shaft and adapted to perform a single revolution therewith.

On the far side of the jointing dies there may be included in the aforementioned unit, an alignment guide, which can take the form of another plunger like the holding gripper plunger, and an end stop, both of which are retractable, being conveniently operable by the same subsidiary cam shaft, which may be extended for this purpose across the unit spaced from and parallel with the crank or eccentric shaft by which the jointing dies are actuated. The unit may comprise also a far side welding electrode, movable onto the coextending parts of the flexible material for the purpose of forming a supplementary connection between them. Such an electrode may be combined with said alignment guide plunger and, where the joints are of the aforementioned type with shouldered incisions, must not be brought into action until after withdrawal of the jointing dies.

The feed may comprise a roller mounted on the same shaft with two constantly but oppositely rotating clutch members which are axially movable simultaneously in each direction to bring one or the other into frictional engagement with said roller or to separate both therefrom in a neutral position of the feed, such axial movement of the clutch member being conveniently effected by a cam on the main cam shaft.

A final tensioning means may be disposed between the feed and the jointing device and comprise a gripper normally held open to permit free passage of the flexible material, under the influence of said feed, in both directions, which gripper, when moved towards the feed for tensioning, closes onto said material but during its return, following completion of the tensioning, is caused to reopen so that it passes freely back along the material. The material is preferably severed just after the reopening of this tensioning gripper and the return of said gripper along the material takes place while the latter is held by the feed in neutral. Such movement of the tensioning gripper may conveniently be effected by another cam on the main cam shaft and the required closing and opening of said gripper be an automatic consequence of said movement.

In the accompanying drawings, which show a typical banding machine according to the invention, by way of example:

Fig. 1 is a front elevation of the whole machine (including a strip delivery mechanism beneath the table or platform and incorporating also a looping mechanism according to a copending application of Frederick William Mosey, Oswald Victor Langford and Jack Wild, Serial No. 668,410, assigned to the same assignee as the instant invention, neither of which forms part of the present invention);

Fig. 2 being a corresponding plan view, with the table or platform, looping guide, and the upper pressure roller of the feed removed;

Fig. 3 is an end view in the direction of arrow 3 of Fig. 2, and

Fig. 4 a diagrammatic perspective view to show the way in which the strip is engaged by the main operative parts;

Fig. 8 is a plan view of the final tensioning unit of the machine,

Figure 10:
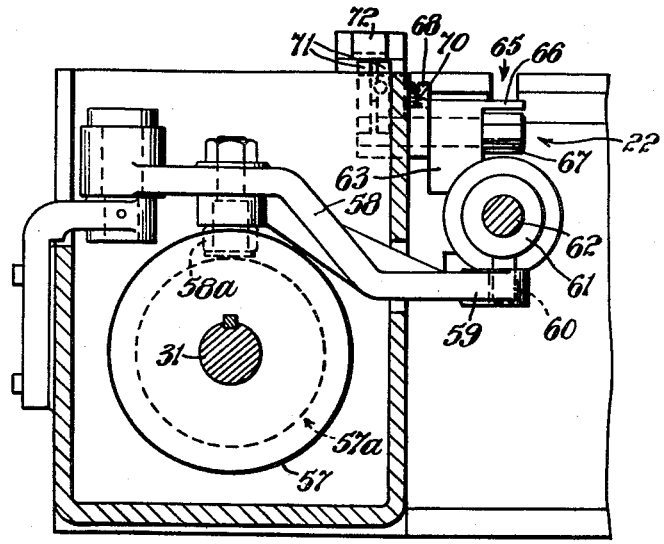
Figure 13:
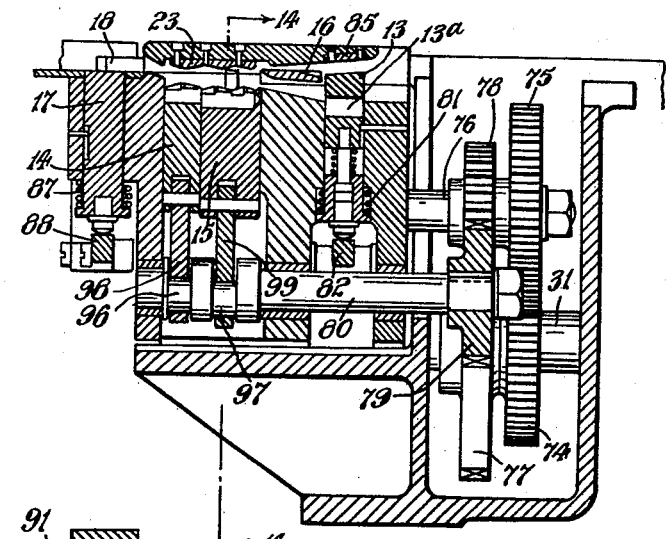
Figure 11:
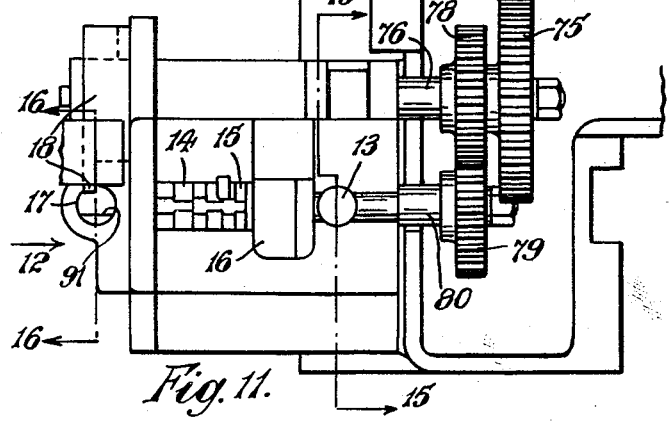
Figure 12:
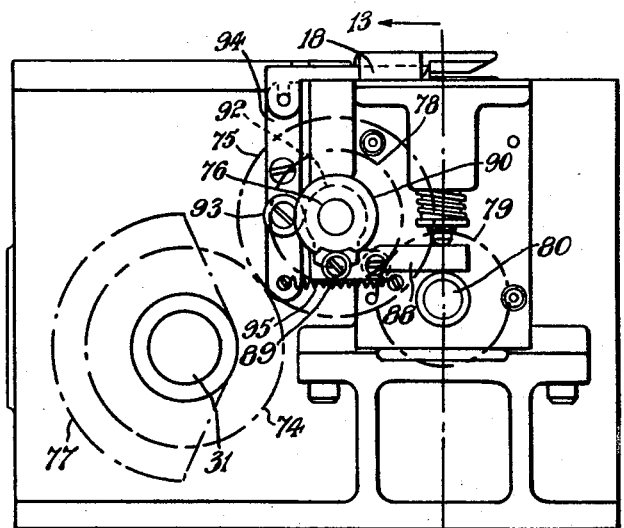
Figures 14, 15:
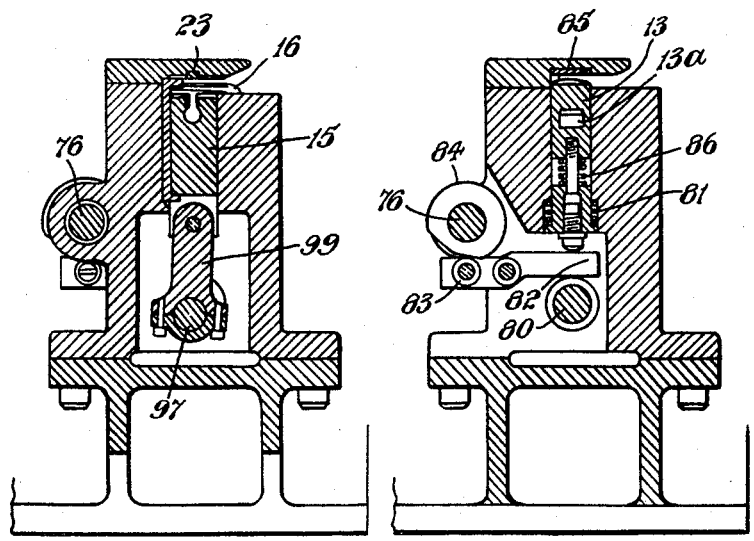

Fig. 9 being a front elevation thereof,

Fig. 10 a section along the line 10—10 of Fig. 9;

Fig. 11 is a plan view of the unit for holding, jointing and severing the strip, Fig. 12 being an end view in the direction of arrow 12 of Fig. 11;

Fig. 13 is a section along the line 13—13 of Fig. 12,

Fig. 14 a section along the line 14—14 of Fig. 13,

Fig. 15 a section along the line 15—15 of Fig. 11, and

Figure 16:
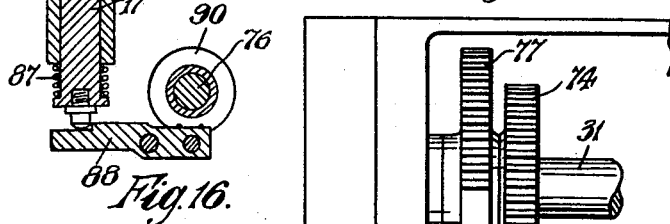

Fig. 16 a section along the line 16—16 of Fig. 11; while in

Figures 17, 18:
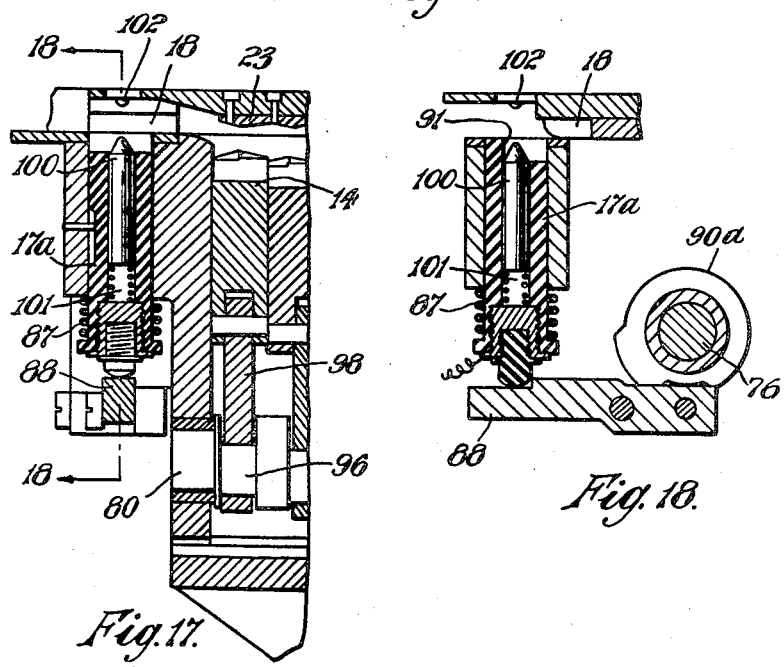

Fig. 17 the far end part of the same unit, as seen in Fig. 13, is shown modified by incorporation in the lateral alignment guide of a welding electrode for forming a supplementary connection, Fig. 18 being a section (similar to that of Fig. 16) along the line 18—18 of Fig. 17.

In the machine thus illustrated, the package or the like is supported in the usual manner on a table or platform 10 within the looping guide 11 and over the unit 12 which is let into the forward edge of said table and includes in the binding plane the holding gripper 13, on the near or feed side of two movable lower jointing dies 14 and 15, the latter also adapted in conjunction with the shear blade 16 to sever the strip, and withdrawable lateral alignment guide 17 and end stop 18 on the far side of the dies. Also in the binding plane on the near side of unit 12 is the peripherally grooved strip feed roller 19 with which the strip from the supply to said unit is normally held in constant frictional engagement by a top pressure roller 20, which is however adapted to be lifted manually by handle 21 as when required for insertion, or longitudinal adjustment of the strip. Between the feed and unit 12 is the final tensioning gripper 22 which normally stays open to permit the passage of strip through it in either direction under the influence of the feed, but when moved towards the latter is adapted to close against the strip and thus tension it in that direction.

Referring to Fig. 4, at the start of an operational cycle, the strip, which has been left by the previous cycle with the severed end of its part S1 beneath blade 16 and extending thereto from the supply between the feed rollers 19 and 20, freely through the final tensioning gripper 22 and threaded through the eye 13a of the open holding gripper 13. The feed is then operated forwardly to project the strip end above the two jointing dies 14 and 15, which are both lowered, and beneath the fixed upper die or die plate 23 with which they coact, on past the alignment guide 17 and the end stop 18, which last must remain retracted at this stage, then around the looping guide 11 and back, as strip part S2, into gripper 13 and over blade 16 this time and so above the jointing dies again and finally up to the stop which has meanwhile come into operative position. Gripper 13 closes onto the strip part S2 immediately the end of the strip reaches said stop and the forward operation of the feed is simultaneously concluded. Thereupon the feed is thrown into reverse and the strip thereby contracted from guide 11 onto the package with a degree of initial tension determined by clutching means, to be described later, in the drive to the feed roller 19, followed by final tensioning of the strip in the same direction by gripper 22 if and as required.

For the purpose of this invention the tensioning of the strip may therefore be applied by a tensioning means which may include either the reverse feed, the final tensioning gripper, or both.

The far side or initial jointing die 14 is then raised against the coextending strip parts, of which S1 is under the full tension applied to the loop and S2 projects freely beyond gripper 13. After the parts have become thus engaged by die 14, at least sufficiently to hold them, gripper 13 may then be released and the near side jointing die 15 is raised, firstly to sever part S1 in conjunction with blade 16 and then into jointing engagement with both the coextending parts, of which S2 is now under tension. The tension in S2 is preferably that existing in the whole loop as a consequence of the reopening of gripper 13; the parts being held by die 14, while the freshly severed S1 extends freely from that die which has meanwhile completed its jointing stroke. Finally, after retraction of the guide 17 and of the stop 18 and lowering of the two dies 14 and 15, thereby completing the operational cycle, the joined loop can be removed forwardly from the machine, leaving a fresh strip part S1 ready for projection at the beginning of the next cycle.

When a supplementary welded connection is required and the alignment guide 17 incorporates an electrode for this purpose, said guide is given a second upward thrust to bring this electrode into operative engagement with the coextending strip parts. Where the joints are of the aforementioned type with shouldered incisions requiring a slight relative longitudinal interengaging movement between the strip parts under the influence of the tension in the loop, it is necessary for the lowering of the dies 14 and 15, sufficiently to free said parts for such interengagement, to take place before said second upward thrust, so that the main joints are fully formed before said welded connection, by which of course said interengaging movement would otherwise be prevented.

As best shown in Fig. 1, such operation of the machine is effected in a fully automatic manner by power from a motor 24 driving through pulleys on an intermediate shaft 25 (by which the aforementioned mechanism for delivering strip from a supply coil 26 through a reservoir 27 under the influence of a counter-weight 28 is actuated) and thence to a pulley 29 on the main driving shaft 30 of the machine extending transversely of the binding plane and which is thus kept continuously rotating. This driving shaft is used further for turning the main cam shaft 31 which extends parallel to the binding plane, once during each operational cycle of the machine, through a worm gear 32 and a positive single-rotation clutch 33 of any suitable kind, as customarily used in machines of the present type and whose operation is initiated manually, as for example from the treadle plate 34 through an appropriate linkage 35. Thus the motor and gear mechanism constitute an operating and timing means to insure the appropriate sequential operation.

Figure 6:
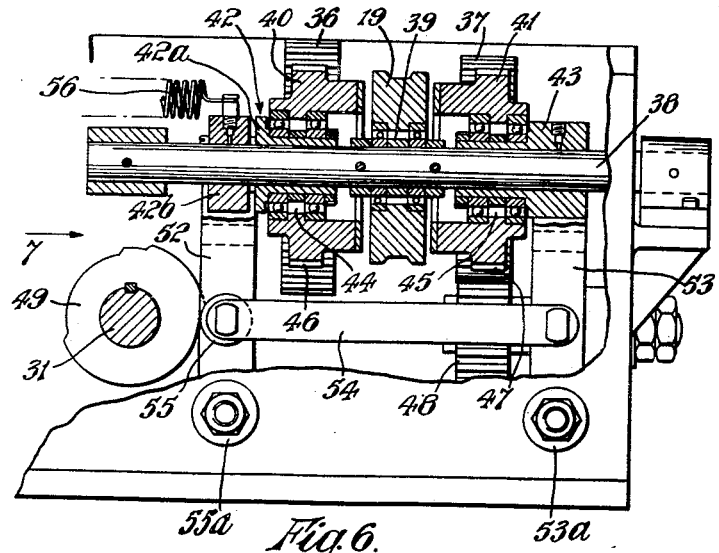
Figure 5:
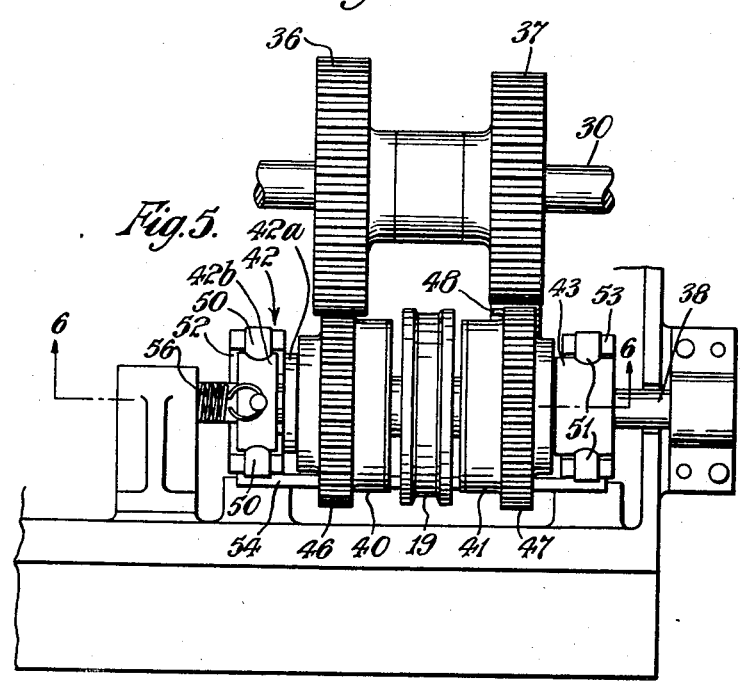
Fig. 5 is a plan view of the strip feed unit of the machine (excluding the upper pressure roller thereof), Fig. 6 being a section along the line 6—6 of Fig. 5, Fig. 7 a view in the direction of arrow 7 of Fig. 6, Fig. 7A a detail along the line 7A—7A of Fig. 7.
Figure 7:
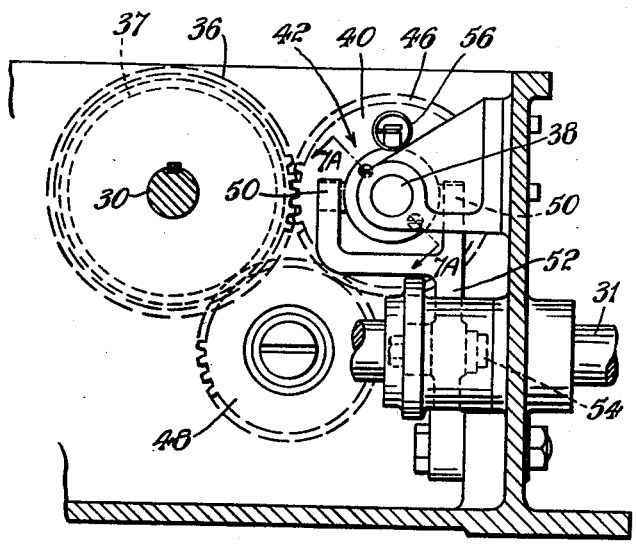
Figure 7A:
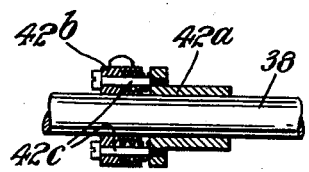

On shaft 30 are also keyed the combination of gears 36 and 37 for driving the feed roller 19 in the following manner, referring to Figs. 5 to 7. Said roller is freely mounted centrally of a fixed shaft 38 which is parallel to shaft 30, by a bearing 39 and, one on either side thereof, are mounted on the same shaft two clutch members 40 and 41 adapted to engage the opposite side faces of said roller frictionally for effecting forward and reverse feeding of the strip respectively. Each of these clutch members is carried on a sleeve support 42, 43 by a bearing 44, 45, which supports are slidable along said shaft together with their respective clutch members. The latter are externally toothed, at 46 in the case of member 40 to mesh with gear 36 so as to be constantly rotated thereby oppositely to the driving shaft 30, and at 47 in the case of member 41 to mesh with gear 37 through an idler gear 48, so as to be constantly rotated thereby in the same sense as shaft 30. The teeth of gears 36 and 48 are sufficiently longer axially than the teeth 46 and 47 to insure that the latter remain in driven engagement in spite of the aforementioned axial movement of the clutch members 40 and 41 with their supports. This movement of said members takes place simultaneously in each direction to bring one or the other of them into frictional engagement with roller 19 or to separate both therefrom in the neutral position, as shown, all under the influence of the two-throw cam 49 on the main cam shaft 31. For this purpose each of the sleeve supports is connected by trunnions 50, 51 with the upper end of a yoke 52, 53 whose lower end is mounted on a fixed pivot 52a, 53a, these yokes being interconnected by a link 54 so that the cam 49 is able to swing both yokes together as required, through the follower 55 and against the influence of the return spring 56, by which therefore the engagement of clutch member 41 with the roller 19 can be wholly determined. On the other hand, as the similar engagement of clutch member 40 with said roller is effected by direct thrust of said cam, it is found desirable to include means for introducing adjustable supplementary resilience in this last mentioned engagement by way of making the support 42 of that member in two parts (as best seen in Figure 7A), the first such part 42a, by which the bearing 44 of said member is carried, being loaded axially with respect to the second such part 42b to which yoke 52 is connected, by means of spring 42c.

Next in order along the main cam shaft 31 from the feed controlling cam 41 comes a cam 57, with a peripheral groove 57a, for actuating the final tensioning gripper 22 through the intermediary of a horizontally swinging arm 58 provided with a follower 58a for engaging said groove, the forward end of which arm is forked at 59 for engagement with a pin 60 depending from one end of a sleeve 61, which is thereby thrust positively by the cam in the direction towards the feed required for the tensioning (i.e. to the right in Figures 8 and 9). This sleeve is thus slidable along a fixed shaft 62 which extends parallel with the strip and also carries the main gripper block 63, similarly slidable under the influence of the thrust from sleeve 61 acting through a powerful coil spring 64 by compression of which the amount of the applied tension is limited. The strip part $S_1$ passes through the gripper from the feed along channel 65 beneath the upper jaw 66 of block 63, against which it is adapted to be engaged by the lower eccentric jaw 67 amounted rotatably in said block. This lower jaw is normally held open, when the gripper 22 is inoperative, by abutment of an extension 68 of said jaw against a stop 69, to permit free passage of the strip under the influence of the feed in both directions as required. When however the gripper becomes operative by the tensioning stroke of block 63, this extension 68 leaves said stop permitting jaw 67 to close under the influence of spring 70. During this stroke a pair of pawls 71 mounted on said extension ride along a toothed ratchet 72 with which they are then brought into engagement at half a tooth pitch, this engagement being under the influence of springs 73 weaker than spring 70, so that it does not tend to reopen jaw 67 at this stage. However, during the return swing of arm 58 and corresponding return stroke of block 63, following completion of the tensioning, the pawls engage the steep faces of the ratchet teeth, thereby overcoming spring 70 and causing positive partial opening of jaw 67 sufficiently to permit free return traversing of gripper 22 along said strip part, until finally said jaw becomes fully opened again by stop 69.

Beyond cam 57 at the far end of the main cam shaft 31 from clutch 33, said shaft is provided with the required gearing for operating the unit for holding, jointing and severing the strip, as now remains to be described with reference to Figs. 13 to 16. This gearing comprises firstly a spur wheel 74 keyed to said shaft and meshing with a similar wheel 75 keyed to a subsidiary cam shaft 76 which extends through said unit in a direction parallel with shaft 31 and, similarly to the latter, makes one full rotation in each operational cycle during which it actuates the near side holding gripper 13 and the far side lateral alignment guide 17 and end stop 18. Said gearing also comprises a toothed quadrant 77, again keyed to shaft 31, adapted to engage, during part only of said cycle, with an idler spur wheel 78 freely mounted for independent rotation on shaft 76. The idler 78 is in constant mesh with a further spur wheel 79 keyed to a crank or eccentric shaft 80, extending through the unit parallel with shaft 76 for actuating the two jointing dies 14 and 15, the engagement of the quadrant 77 with wheel 78 being such as to effect one full rotation of the shaft 80 for this purpose at the appropriate time.

Referring to Fig. 15, gripper 13 is in the form of a plunger normally urged downwardly, i.e. to open the gripper, by a spring 81 against which said plunger is raised, in the manner of a tappet, through a rocker 82 whose follower 83 engages with a cam 84 on shaft 76, resilience being introduced into the upward closure of the gripper in this way against the counter plate 85, by means of an internal spring 86. As already mentioned, this gripper is preferably timed to reopen as soon as strip part S2 has become held by die 14, although such opening can be delayed up to as late as the end of the operational cycle. Guide 17 similarly takes the form of a plunger actuated, against its spring 87 by which it is normally retracted, through a rocker 88 whose follower 89 engages with a cam 90 on the same shaft as shown in Fig. 16. In the timing of this guide the main thing again is for it to be retracted (see Fig. 16) by the end of the cycle to permit removal of the finished loop. However, as it is convenient also to make use of the containing face 91 of said guide for directing the free end of the strip into the looping guide 11, it is preferable for that face to rise into operative position as said end approaches, after its first pass over dies 14 and 15. In the case of the stop 18, the essential is for it to be retracted when required to permit the initial projection of the strip and to be brought into operative position for the second pass thereof, i.e. approximately simultaneously with the rising of gripper 13. The actuation of the stop in this way is effected by the cam 92 on shaft 76 through the follower 93 on rocker 94 against the spring 95.

The dies 14 and 15 are arranged immediately adjacent one another, being movable against the coextending strip parts (with severing of part S1 in conjunction with blade 16 in the case of die 15) and subsequently withdrawn, all in the required sequence already described, by the respective eccentrics 96, 97 of shaft 80 and sheaves 98, 99.

Where the guide 17 incorporates an electrode 100 for a supplementary connection as shown in Figs. 17 and 18, the guide plunger 17a is made of insulating material in the form of a sleeve around said electrode whose tip is caused to project from said sleeve under the influence of an internal spring 101. A double-throw actuating cam 90a is used in this case on shaft 76, by which the plunger sleeve 17a is first raised in the manner already described into position to perform its primary function, after which, timed to follow the lowering of dies 14 and 15 sufficiently to release the strip parts for their joint interengaging movement, said sleeve is raised further to bring the electrode 100 into welding engagement with said portions in conjunction with the upper fixed electrode 102, after which the plunger 17a is fully retracted.

It is necessary to the proper operation of the machine for strip part S1 not to be longitudinally displaced following severing, but for its end to remain at the severing point. Otherwise the extent of the forward projection of the strip, as determined by the constant duration of the engagement of clutch member 40 with roller 19 under the influence of cam 49, in conformity with the length of guide 11, will be erratic in successive operational cycles. In order to prevent said end from being drawn back following severing, the reverse feeding by the engagement of the other clutch member 41 with said roller must therefore be concluded, i.e. by return of said clutch members to neutral, before said part S1 has been severed by die 15 and also before it has been freed from its engagement by gripper 22.

As the feed when thus in neutral is capable of holding the strip sufficiently firmly to avoid risk of the strip being dragged along by that gripper when partly open; besides the return traverse along the strip of the gripper in this condition (under the influence of the return swing of arm 58 and the positive engagement in this direction of teeth 71 with the ratchet 72) not being liable to cause any undesirable forward creeping of the severed end, there is also no difficulty in similarly guarding against backward displacement of the latter (such as might result from the sudden release of any compression there may be in spring 64 if severing were to take place while said gripper still remains closed onto the strip) by postponing the severing until just after the reopening of the gripper (by the commencement of said return swing of arm 58) so that the gripper is thus first freed to ride along the strip in the direction of tensioning (as the nature of the engagement between the teeth 71 and ratchet 72 permits in that direction when not subject to tension) to the extent that the expansion of said spring to its normal length may require, before said return traverse of the gripper takes place while said return swing of arm 58 is still in progress. Whether or not the reopening of gripper 22 thus precedes severing, it is preferable for the reverse feeding to be continued right up to said reopening (providing it definitely finishes before the severing where the latter follows the reopening) in order to avoid any slight looping up of the strip between the feed and said gripper (when closed during the final tensioning) such as would be liable to occur if the feed were then in neutral and might lead to variation, on this account, in the extent to which the severed end is left projected in successive cycles.

I claim:

1. A mechanism for tying packages or the like with flexible binding material fed from a supply, comprising in combination drive means, material looping means, material feed means operatively connected to said drive means and adapted to feed the material from said supply into said looping means, said looping means being effective to place a first portion of the material extending to the free end thereof in overlapping relation with respect to a second portion of the material extending to said feed means and thus define a material loop, gripping means operatively connected to said drive means for movement into engagement with said first portion at a point spaced from said free end, material tensioning means operatively connected to said drive means and adapted to move said second portion in a direction opposite the direction of feed after engagement of said first portion by said gripping means and thereby to close said loop, joining means operatively connected to said drive means and disposed intermediate said looping means and said gripping means, said joining means comprising a die plate and at least two juxtaposed dies disposed longitudinally of said overlapping portions on the opposite side thereof from said die plate, said dies being movable successively toward said plate into engagement with the material to form a single joint between said portions, said joint being continuous and having two contiguous parts, and means disposed intermediate said feed means and said joining means for severing said second portion after the portions have become held by such movement of the first of said dies in forming the first part of said joint, but before such movement of a second of said dies disposed intermediate said first die and said severing means to form the second part of said joint.

2. The mechanism of claim 1 wherein said severing means comprises a blade disposed adjacent the feed side of said joining means and a cutter mounted on said second die, said cutter adapted to coact with said blade to effect severing of the material from the supply as said second die moves toward said die plate into engagement with said coextending parts of material.

3. The mechanism of claim 1 wherein the joining dies are associated in a unit together with the gripping means.

4. The mechanism of claim 1 wherein said gripping means is an upwardly movable plunger having a transverse aperture through which the flexible material may be projected by said feed means and withdrawn by said tensioning means, and wherein the material is adapted to remain threaded over a plurality of package tying cycles.

5. The structure of claim 1 wherein said feed means comprises a shaft, a roller mounted thereon, a first clutch member mounted on said shaft and connected to said drive means, said first clutch member being selectively engageable with said roller to effect rotation thereof in one direction, a second clutch member mounted on said shaft and connected to said drive means, said second clutch member being selectively engageable with said roller to effect rotation thereof in a direction opposite to that imparted by said first clutch member, and means to effect movement of one of said members away from said roller when the other is being moved into engagement with said roller.

6. The structure of claim 1 wherein said tensioning means includes a tension gripper disposed intermediate said joining means and said feed means, said tension gripper being normally held open to permit free passage of the flexible material in both directions under the influence of said feed means and being movable axially toward and away from said feed means, said tension gripper adapted to close upon and engage said material when said gripper is moving toward said feed means, and to open for release of the material upon movement away from said feed means following the completion of the tensioning.

7. The structure of claim 1 wherein an alignment guide is provided, said guided being movable to effect alignment of the superposed portions of flexible material prior to the engagement thereof by said joining means.

8. The structure of claim 1 wherein a welding electrode is provided, said electrode being movable into engagement with the superposed portions of material to effect a supplementary connection therebetween following withdrawal of said joining means for the material engaging position.

9. A mechanism for tying packages or the like with flexible binding material fed from a supply, comprising in combination drive means, material looping means, material feed means operatively connected to said drive means and adapted to feed the material from said supply into said looping means, said looping means being effective to place a first portion of the material extending to the free end thereof in overlapping relation with respect to a second portion of the material extending to said feed means and thus define a material loop, gripping means operatively connected to said drive means for movement into engagement with said first portion at a point spaced from said free end, material tensioning means operatively connected to said drive means and adapted to move said second portion in a direction opposite the direction of feed after engagement of said first portion by said gripping means and thereby to close said loop, joining means operatively connected to said drive means and disposed intermediate said looping means and said gripping means, said joining means comprising a die plate and at least two juxtaposed dies disposed longitudinally of said overlapping portions on the opposite side thereof from said die plate, said dies being movable successively toward said plate into engagement with the material to form a single joint between said portions, said joint being continuous and having two contiguous parts, means disposed intermediate said feed means and said joining means for severing said second portion after the portions have become held by such movement of the first of said dies in forming the first part of said joint, but before such movement of a second of said dies disposed intermediate said first die and said severing means to form the second part of said joint, and means for effecting release of said gripping means after said first die has moved into engagement with the material and before said second die has moved into engagement therewith, whereby the first portion of the material is subjected to the tension in the whole of the material loop before the second part of the joint is formed.

10. A mechanism for tying packages or the like with flexible binding material comprising in combination power actuated means, a main cam shaft operatively connected to said power actuated means and having a cam mounted thereon, material looping means, material feed means adapted to feed the material into said looping means, said feed means comprising a shaft, a roller mounted thereon, a first clutch member mounted on said shaft on one side of said roller and operatively connected to said power means, said first clutch member being selectively engageable with said roller to effect rotation thereof in one direction, a second clutch member mounted on said shaft on the other side of said roller and operatively connected to said power means, said second clutch member being selectively engageable with said roller to effect rotation thereof in a direction opposite to that imparted by said first clutch member, a connecting means disposed intermediate said first and second clutch members to effect movement of one of said members away from said roller when the other is being moved into engagement with said roller, said clutch members being resiliently urged in a direction to effect engagement of one of said clutch members with said roller, the cam mounted on said main cam shaft being effective to move said clutch members in an opposite direction to effect engagement of the other of said clutch members with said roller, said looping means being effective to place the free end of the flexible material in coextending superposed relation with a second portion of the material, gripping means disposed adjacent said looping means and operatively connected to said power means for movement into gripping engagement with the flexible material adjacent the free end thereof, material tensioning means operatively connected to said power means and adapted to move said material in a direction opposite the direction of feed after the material has been engaged by said gripping means, joining means operatively connected to said power means and disposed intermediate said looping means and said gripping means, said joining means comprising a die plate and at least two dies disposed longitudinally of the coextending superposed portions of material on opposite sides thereof from said die plate, said dies being movable successively toward said plate into engagement with the material, the first of said dies being thus movable sufficiently to hold said coextending parts of the material, means for severing the flexible material intermediate said feed means and said joining means after said material is engaged by said first die, a second of said dies being movable into engagement with said material adjacent said first die and adapted to cooperate with said first die to effect joining of said superposed portions of material.

11. A mechanism for tying packages or the like with flexible binding material comprising in combination power actuated means, material looping means, material feed means operatively connected to said power actuated means and adapted to feed the material into said looping means, said looping means being effective to place the free end of the flexible material in coextending superposed relation with a second portion of the material, a main cam shaft operatively connected to said power means and having a cam mounted thereon, gripping means disposed adjacent said looping means and operatively connected to said power means for movement into gripping engagement with the flexible material adjacent the free end thereof, material tensioning means including a tension gripper element disposed intermediate said joining means and said feed means, said tension gripper element being normally held open to permit free passage of the flexible material in both directions under the influence of said feed means and being movable axially toward and away from said feed means, said tension gripper element having a portion engageable with the cam mounted on said main cam shaft to effect axial movement of said tension gripper element, joining means operatively connected to said power means and disposed intermediate said looping means and said gripping means, said joining means comprising a die plate and at least two dies disposed longitudinally of the coextending superposed portion of material on opposite sides thereof from said die plate, said dies being movable successively toward said plate into engagement with the material, the first of said dies being thus movable sufficiently to hold said coextending parts of the material, means for severing the flexible material intermediate said feed means and said joining means after said material is engaged by said first die, a second of said dies being movable into engagement with said material adjacent said first die and adapted to cooperate with said first die to effect joining of said superposed portions of material.

12. A mechanism for tying packages or the like with flexible binding material comprising in combination power actuated means, material looping means, a main cam shaft having a plurality of cams thereon, material feed means adapted to feed said material into said looping means and having a portion engageable with one of the cams on said main shaft, the rotation of which effects the direction and application of feed, a single rotation clutch disposed intermediate said power means and said main cam shaft, said clutch being actuatable to effect transmission of power to said cam shaft for one revolution thereof, a unidirectionally rotatable shaft connected to said main cam shaft and having a plurality of eccentric portions, gripping means disposed adjacent said looping means operatively connected to said power means for movement into gripping engagement with the material adjacent the free end thereof, a tension gripper having a portion engageable with another of the cams on said main shaft and adapted to move said material in a direction opposite the direction of feed after the material has been engaged by said gripping means, joining means disposed intermediate said looping means and said gripping means and comprising a die plate and at least two dies disposed longitudinally of the coextending superposed portions of material on the opposite side thereof from said die plate, said dies having portions which are engageable with the eccentric portions of said unidirectional rotatable shaft, said dies being movable successively toward said plate into engagement with said material, such movement being effected by the rotation of said unidirectional shaft, the first of said dies being thus movable sufficiently toward said plate to hold said coextending parts, severing means disposed intermediate said joining means and said feed means for severing the flexible material after said first die has moved into contact with the coextending parts thereof, a second of said dies being movable into engagement with said material adjacent said first die and adapted to cooperate with said first die to effect joining of said superposed portions of material.

13. A mechanism for tying packages or the like with flexible binding material comprising in combination power actuated means, material looping means, material feed means, operatively connected to said power actuated means adapted to feed said material into said looping means, said looping means being effective to place the free end of the flexible material in coextending superposed relation with a second portion of the material, a main cam shaft operatively connected to said power means, a subsidiary shaft geared to said main cam shaft and having a plurality of cams mounted thereon, an alignment guide having a portion which is adapted to engage one of the cams mounted on said subsidiary shaft, the rotation of said subsidiary shaft being effective to move said alignment guide into engagement with said flexible material, stop means disposed intermediate said looping means and said feed means and having a portion engageable with another of the cams mounted on said subsidiary shaft the rotation of which effects movement of said stop means into the path of the free end of the flexible material, thereby stopping the forward movement thereof, gripping means disposed intermediate said stop means and said feed means, and having a portion engageable with a third cam mounted on said subsidiary shaft the rotation of which effects movement of said gripping means into gripping engagement with the material adjacent the free end thereof after the material has been engaged by said stop means, material tensioning means operatively connected to said power means, and adapted to move said material in a direction opposite the direction of feed after the material has been engaged by said gripping means, joining means operatively connected to said power means and disposed intermediate said stop means and said gripping means, said joining means comprising a die plate and at least two dies disposed longitudinally of the coextending superposed portions of material on the opposite side thereof from said die plate, said dies being movable successively toward said plate into engagement with the material, the first of said dies being thus movable sufficiently to hold said coextending parts of the material, means for severing the flexible material intermediate said feed means and said joining means after said material is engaged by said first die, a second of said dies being movable into engagement with said material adjacent said first die and adapted to cooperate with said first die to effect joining of said superposed portions of material.

14. A mechanism for tying packages or the like with flexible binding material comprising in combination power actuated means, a main cam shaft operatively connected to said power actuated means having a plurality of cams mounted thereon, material feed means operatively connected to said power means adapted to feed said material into said looping means, said feed means having a portion engageable with one of the cams mounted on said main cam shaft for controlling the direction of feed, said looping means being effective to place the free end of the flexible material in coextending superposed relation with a second portion of the material, a subsidiary shaft geared to said main cam shaft and having a plurality of cams mounted thereon, an alignment guide having a portion which is adapted to engage one of the cams mounted on said subsidiary shaft, the rotation of which is effective to move said alignment guide into engagement with said flexible material, stop means disposed intermediate said looping means and said feed means and having a portion engageable with another of the cams mounted on said subsidiary shaft, the rotation of which effects movement of said stop means into the path of the free end of the flexible material thereby stopping the forward movement thereof, gripping means disposed intermediate said stop means and said feed means and having a portion engageable with a third cam mounted on said subsidiary shaft, the rotation of which effects movement of said gripping means into engagement with the material adjacent the free end thereof after the material has been engaged by said stop means, a tension gripper element having a portion engageable with another of the cams on said main cam shaft and adapted to move said material in a direction opposite the direction of feed after the material has been engaged by said gripping means, a unidirectionally rotatable shaft connected to said main shaft for rotation during a part of the revolution of said main cam shaft and having a plurality of eccentric portions, and joining means disposed intermediate said looping means and said gripping means and comprising a die plate and at least two dies disposed longitudinally of the coextending superposed portions of material on the opposite side thereof from said die plate, said dies having portions which are engageable with the eccentric portions of said unidirectional rotatable shaft, said dies being movable successively toward said plate into engagement with said material, such movement being effected by the rotation of said unidirectional shaft, the first of said dies being thus movable sufficiently toward said plate to hold said coextending parts, severing means disposed intermediate said joining means and said feed means for severing the flexible material after said first die has moved into contact with the coextending parts thereof, a second of said dies being movable into engagement with said material adjacent said first die and adapted to cooperate with said first die to effect joining of said superposed portions of material.

15. A mechanism for tying packages or the like with elongate flexible binding material from a supply comprising material looping means, material feed means to feed material from said supply to said looping means, said looping means being effective to place a free end of said material in coextending superposed relationship with a second portion of said material and thus define a loop, gripping means to engage said material adjacent but spaced from said free end, tensioning means to move said second portion in a direction opposite to the direction of feed to close said loop in cooperation with said gripipng means, joining means engageable with said second portion and said superposed free end, and severing means between said joining means and said supply actuated while said second portion and said free end are being joined, said joining means comprising two juxtaposed sequentially operable elements, the first of these elements being movable into engagement with the free end and second portion of the flexible material after the operation of said tensioning means, the second joining element being disposed immediately adjacent the first-mentioned joining element intermediate that joining element and said severing means and being engageable with the free end and the second portion of said flexible material and operating after said severing means.

16. A mechanism for tying packages or the like with elongate flexible binding material from a supply comprising material looping means, material feed means to feed material from said supply to said looping means, said looping means being effective to place a free end of said material in coextending superposed relationship with a second portion of said material and thus define a loop, gripping means to engage said material adjacent said free end, tensioning means to move said second portion in a direction opposite to the direction of feed to close said loop in cooperation with said gripping means, joining means engageable with said second portion and said superposed free end, and severing means between said joining means and said supply actuated while said second portion and said free end are being joined, said joining means comprising two sequentially operable elements, the first of said elements being adapted to engage the free end and the second portion of said material when said second portion is in tension and said free end is free, the second joining element being disposed intermediate said first element and said severing means and engageable with said free end and said second portion while said free end is in tension.

References Cited in the file of this patent

UNITED STATES PATENTS

| | | |
|---|---|---|
| 1,650,844 | McChesney | Nov. 29, 1927 |
| 2,261,665 | Robertson | Nov. 4, 1941 |
| 2,630,751 | Cranston et al. | Mar. 10, 1953 |